Figure 1:
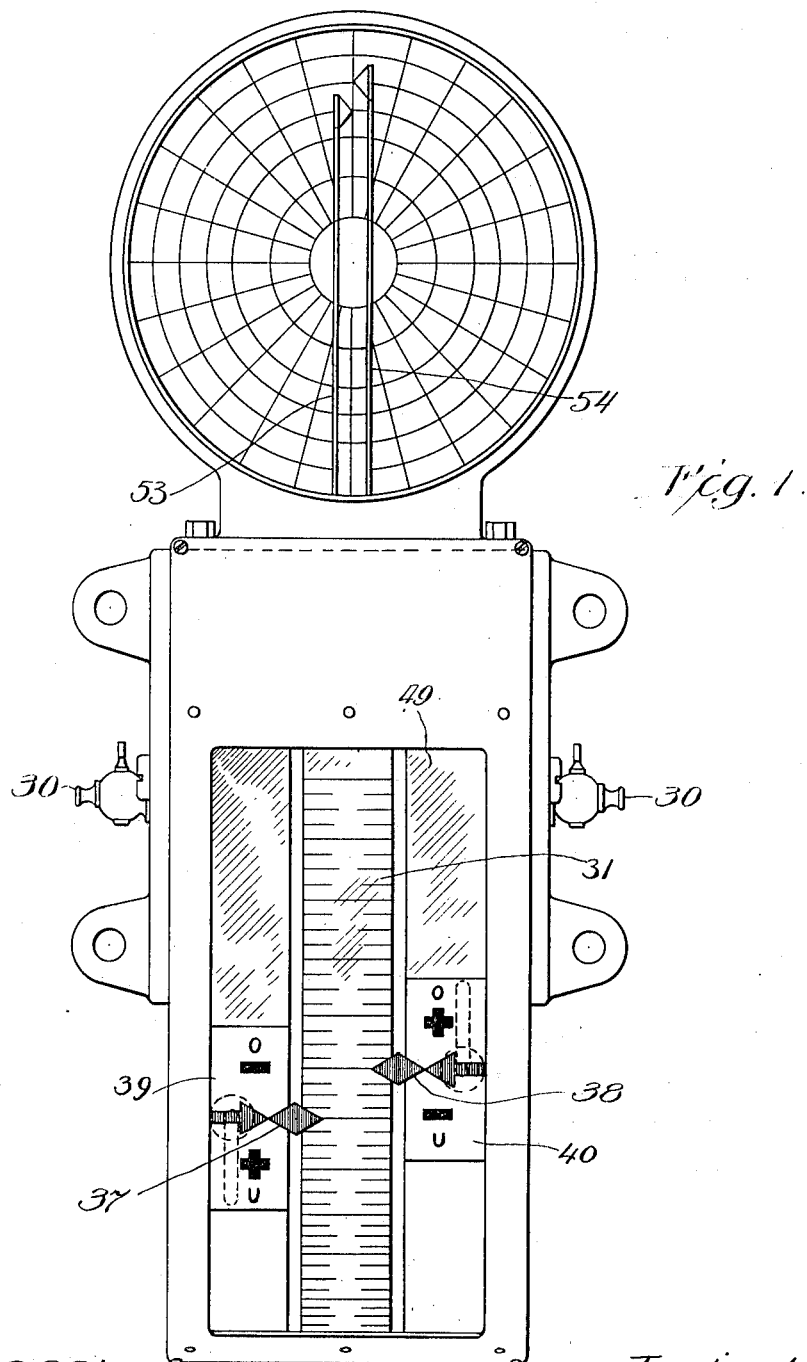

W. A. BLONCK.
FURNACE METER.
APPLICATION FILED AUG. 29, 1912.

1,055,255.

Patented Mar. 4, 1913.

3 SHEETS—SHEET 3.

Witnesses:
Harry S. Gaither
Thomas A. Banning Jr.

Inventor:
William A. Blonck
by Banning & Banning
Attys

UNITED STATES PATENT OFFICE.

WILLIAM A. BLONCK, OF CHICAGO, ILLINOIS.

FURNACE-METER.

1,055,255.  Specification of Letters Patent.  Patented Mar. 4, 1913.

Application filed August 29, 1912. Serial No. 717,768.

*To all whom it may concern:*

Be it known that I, WILLIAM A. BLONCK, a citizen of the United States, residing at Chicago, in the county of Cook and State of Illinois, have invented certain new and useful Improvements in Furnace-Meters, of which the following is a specification.

Many forms of furnace efficiency meter have been devised for the purpose of enabling the engineer or fireman to estimate the conditions existing within the furnace and particularly to enable him to determine whether or not such conditions are the best for maximum economy in fuel consumption, etc. On account of the number of different factors which influence the efficiency of a furnace, it has been found very difficult to provide an instrument of simple construction, whose readings can be easily interpreted by an operator, at the same time providing an instrument which shall be reliable in its operations and shall give a true indication as to the conditions within the furnace.

It has been ascertained that furnace conditions may be determined by a comparison of the pressure or draft existing in the furnace with respect to the conditions of pressure between the furnace and the damper. The first mentioned factor is an absolute measure of pressure with respect to the atmosphere, and gives a measurement of the tendency for the air to be drawn or forced through the fuel bed, while the second factor is a difference of pressure and shows a loss of pressure between the furnace and the damper, which loss of pressure is due to the flow of gas through the furnace flues, etc., and is, therefore, an indication of the quantity of gas passing per unit of time. On account of the interrelationship which exists between the above mentioned factors, and on account of the fact that the boiler efficiency or economy for each set of conditions of load, etc., depends upon this interrelationship, it has heretofore been impossible, as far as I am aware, to provide an instrument which will show by its instantaneous readings whether or not all of the factors are correct for the maximum economy, and in case they are not correct will give an indication as to the proper changes or readjustment to be made for the purpose of again restoring the conditions of maximum economy. Because of the fact that there are two pressures to be indicated, namely, the furnace pressure and the difference between the furnace and damper pressures, it follows that two separate measuring devices must be provided, one for each of these factors. In previous instruments of the general class to which this invention relates, it has been necessary for the fireman or operator to watch the two separate needles or other indicating devices corresponding to these two factors, and to attempt, by a comparison of the individual readings thus obtained with an instruction sheet or the like, to readjust the furnace conditions so as to improve the efficiency. The average furnace operator, however, not being skilled in the use of mechanical instruments and possibly not understanding the fundamental principles upon which their operation depends, is unable to intelligently apply the results of such meter indications as the above.

It has been found that for each furnace there are certain "constants" or characteristics which do not vary with the change of load and other conditions of the furnace; such, for example, as the gas resistance between the furnace and the damper. When the above constants have been determined for any particular furnace, the instrument may be calibrated and points may be determined on the scale which will correspond to the maximum efficiency of the particular installation.

The main object of this invention is to provide a scale for an instrument of the above class which scale can be adjusted according to the particular characteristics of the furnace, so that the only burden upon the fireman or operator will be that of so adjusting the conditions of draft, etc., as to cause the instrument to indicate at the points designated on the scale of the instrument.

Another object of the invention is to mark the scale in such a way that in case the instrument shows that the conditions are not those for maximum economy, the operator will know in a general way what changes should be made so as to restore the conditions to those of maximum economy.

Another object of the invention is to provide an indicating instrument of improved mechanical construction, and one which shall have a maximum of sensitiveness, and consequently give the most accurate indications which can be obtained. Nevertheless, the instrument of the construction herein disclosed is one constructed on sound mechanical principles and is of great simplicity, so that it is extremely durable and well adapted to withstand the class of service and conditions to which it will be subjected. It will be understood that instruments of this class are in general mounted in locations where they are liable to be rapidly deteriorated on account of dust, grit, etc. For this reason, satisfactory instruments of this class should be well protected and the instrument herein disclosed is of such design that it can be very easily built, practically dust-proof, all of its moving parts being well inclosed and protected against the access of dust and the like.

Still another object of the invention is to provide an instrument which can be easily adjusted, so as to accurately indicate and record the furnace conditions, and so that it can be made to record accurately for different scales which it may be found advisable to adopt. For example, if in some locations, it should be desirable to use a scale, which is wide open in the middle but closed at the ends, the instrument should be adjusted in a different manner from that which would be required if a scale were being used which was closed in the middle and wide open at the ends. The construction herein disclosed is such that the aforementioned adjustment can be readily made.

Still a further object is to combine a recording dial or drum with the indicating instrument, so that a continuous record may be preserved showing the variations of furnace conditions over a considerable period of time.

Other objects and uses will appear from a detailed description of the invention which consists in the features of construction and combination of parts hereinafter described and claimed.

Figure 2:
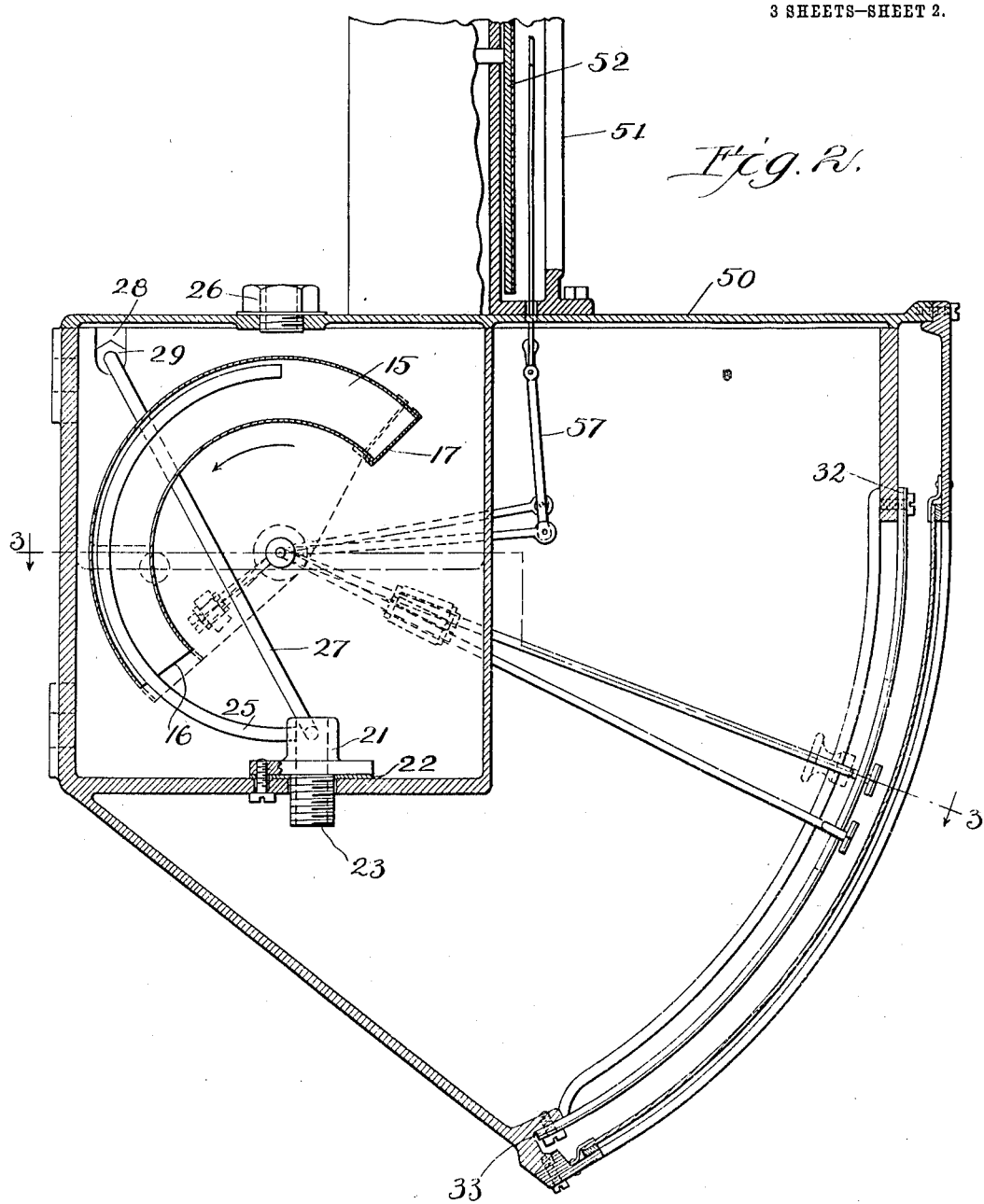
Figure 3:
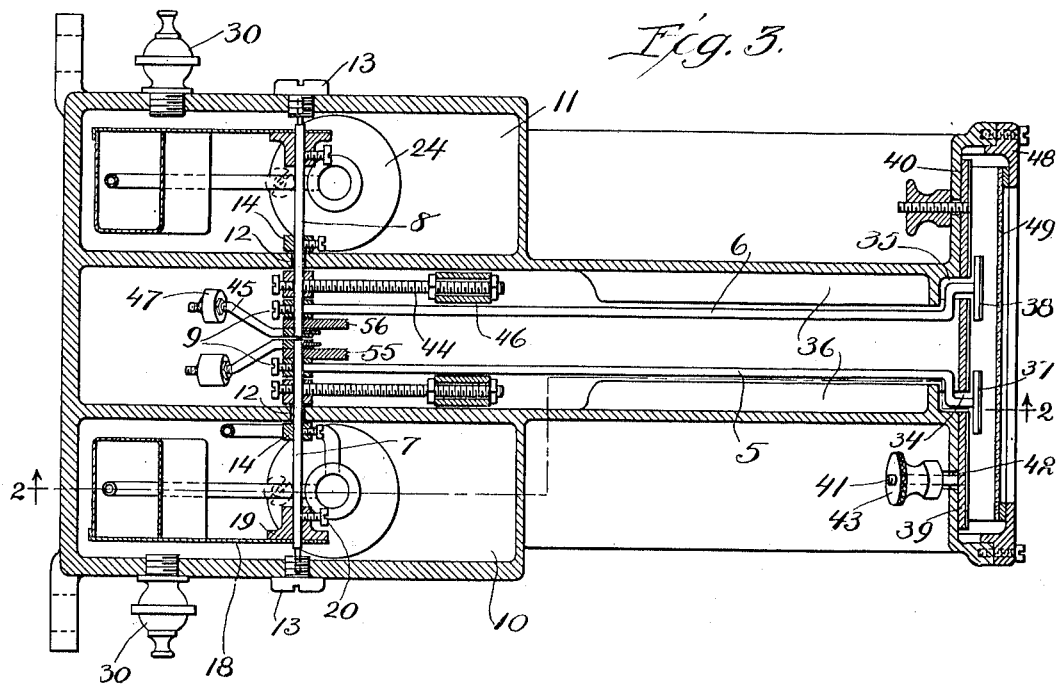

In the drawings, Figure 1 shows a front view of the combined indicating and recording instrument; Fig. 2 shows a section taken on the line 2—2 of Fig. 3, looking in the direction of the arrows; Fig. 3 shows a section taken on the line 3—3 of Fig. 2 looking in the direction of the arrows; and Fig. 4 shows a front view of a modified construction of instrument.

Figure 4:
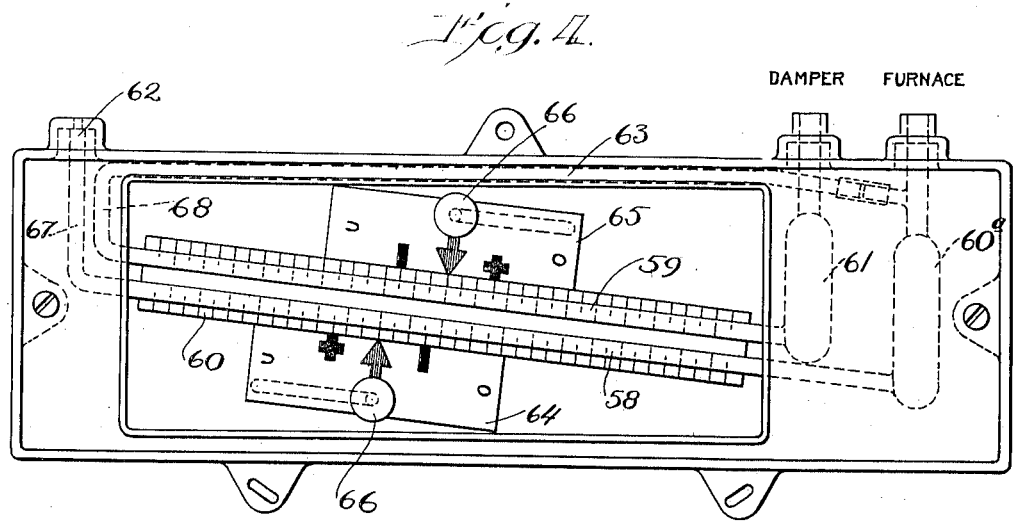

I will first describe the instrument shown in Figs. 1, 2, and 3, and will then describe the modification shown in Fig. 4.

It will be evident from what has been previously stated that the instruments of the present invention depend for their operation primarily upon gas pressure. Means must, therefore, be provided for indicating these pressures either by the position of a pointer or needle actuated by the pressure, or else by the elevation of any suitable liquid, as, for instance oil. In the construction of Figs. 1, 2, and 3, two needles 5 and 6 are provided, the former indicating the furnace pressure, and the latter indicating the differential or difference between the pressures in the furnace and at the damper, which difference is a measure of the loss of pressure between the furnace and the damper. These needles are secured to shafts 7 and 8 respectively by means of set-screws 9, by means of which set-screws the needles can be adjusted on their respective shafts. The shafts extend into casings 10 and 11 respectively, being journaled at the points 12 where they enter the casings and in screw-bearings 13 at their inner ends. A collar 14 is mounted on each shaft just inside of its corresponding case. By means of screw-bearings 13 the shafts are very delicately mounted, and by means of the collars 14 they are held against end play. It will soon be apparent also that the bearing where the shaft 8 enters its casing should be comparatively air-tight.

Each shaft carries an arcuate tube or shell 15, the same being open at its lower end 16 and closed at its upper end 17. In the particular construction illustrated, these tubes or shells are secured to the segmental disks 18 which, in turn, carry the collars 19 which are secured to their respective shafts by the set-screws 20. By means of these set-screws, the tubes or shells can be adjusted on the shafts until they occupy the proper angular positions with respect to their corresponding needles.

In the lower end of each casing, is mounted a nipple or the like 21 which projects through the casing and can be connected to a pipe leading from the furnace or from the flue at a point just in advance of the damper, as the case may be, gaskets 22 serving to provide tight joints between the needles and casing. The nipple 23 of the casing 10 leads to the furnace, while the nipple 24 of the casing 11 leads to a point in advance of the damper. A curved tube 25 is tapped into each nipple and extends up into the corresponding shell 15, substantially as shown in Fig. 2. These tubes 25 are of such length that they reach into their respective shells at all positions which the latter may occupy, and thus maintain the gas pressure within the shells at the same degree as the pressures existing in the furnace and at the damper respectively.

Oil of suitable specific gravity is introduced into the lower portion of each casing and immerses the lower end of each of the shells at all positions of the latter. As soon as the pressure within one of the shells is reduced to a point below that in the space immediately above the oil of the corresponding casing, such oil will be raised or sucked up into the open end of the corresponding shell, substantially as shown by the dotted line in Fig. 2, which oil, by reason of its weight, will create an unbalance tending to rotate the shell over in the direction of the arrow, thus simultaneously rotating the corresponding shaft and any devices which may be attached to it. The amount of this rotating tendency will be dependent upon the difference in pressure between the interior and exterior of the shell, so that the amount of rotation is a measure of such difference in pressure.

The case 10 has its upper portion open to atmosphere, a perforated plug 26 being tapped into it, allowing atmospheric pressure to be exerted within the casing. On the other hand, the space above the oil within the casing 11 is subjected to furnace pressure, so that the rotating tendency exerted on the shaft 8 will be dependent upon the differential or difference between the furnace pressure and that at the damper. For this purpose a tube 27 leads from the nipple 21 through a notch 28 in the side of the casing 10 and is tapped into the upper portion of the casing 11. A nut or the like 29 on this tube serves to effect a gas-tight joint at the point which leads into the casing 11.

By means of pet-cocks 30 the oil level in each casing may be exactly adjusted, said pet-cocks preferably being placed at the exact oil levels desired.

It will now be apparent that the needles 5 and 6 will be oscillated back and forth and will occupy instantaneous positions corresponding to the furnace pressure and to the differential pressure respectively. Means are provided for indicating the conditions corresponding to the needle positions. For this purpose, a scale 31 is carried by the forward portion of the instrument, said scale being secured at its upper and lower ends 32 and 33 respectively. The frame of the instrument is so constructed as to provide angular slots 34 and 35, through which the forward ends of the needles pass. A rib 36 is formed immediately behind each of these slots, the needles being off-set in advance of these ribs, so that, as the observer faces the instrument, the slots seem to be closed by the ribs. In this manner, the appearance of the instrument is improved and the positions of the needles are much more easily observed. The forward ends of the needles carry the pointers 37 and 38 respectively. These are of such width as to overlie the scale 31 and side plates 39 and 40 which are mounted outside of their respective slots.

It was previously stated that for each furnace, there exist certain constants, so that the instrument for any given furnace should give certain indications when the furnace is operating under the best conditions. It is desired to provide a simple means for indicating to the fireman or operator proper positions at which the needles should be mounted. For this purpose, the plates 39 and 40 have been provided. Each of these is provided with an arrow or other indicating means, which is prominently marked, so as to attract the attention of the operator and which can be seen at a sufficient distance from the instrument to enable the operator to make the necessary adjustments with regard to draft, etc., and at the same time watch the instrument and be informed when he has secured the proper adjustments.

The plates 39 and 40 can be slid back and forth with respect to the scale 31 into positions corresponding to the particular furnace. For this purpose, each of these plates is provided with a pin 41 which extends through a slot 42, a thumb-screw or the like 43 threaded onto each pin permitting the corresponding plate to be locked into the desired position. The amount of adjustment necessary in any case is relatively small and, therefore, the slots 43 do not have to be of great length. For this reason, it will generally be possible to make the plates 39 and 40 long enough so as to completely cover or hide the slots at all positions, this fact being well shown in Fig. 1.

The plates 39 and 40 with their markings are for the purpose of assisting the operator to secure the proper adjustments of his furnace draft, etc. As a simple means of indicating what change should be made in order to restore each of the needles with its pointer to the proper position, I have provided markings such as shown on the respective plates, although it will be understood that any other marks might be used which would serve the same or a similar purpose. In the figures the plus and minus signs have been adopted for indicating that the drafts are too large or too small. For example, if the pointer 37 stands above the air-plate 39, it will occupy the region designated by the minus sign. This will indicate to the operator that the furnace draft is too small and that he should increase the same in order to improve the efficiency. Of course, in case the operator were an expert, the different characters might be left off of the plates 39 and 40, although as a general proposition their presence would be desirable.

For the purpose of permitting the use on any given instruments of different scales, as, for example, scales having their marks close together or wide apart in the middle, I have provided the adjustment weights shown particularly in Figs. 2 and 3. For this purpose, each of the shafts carries the arms 44 and 45 having the weights 46 and 47 respectively. Each arm can be rotated to any desired position on its shaft, and then locked in such position, and each weight can be moved in or out along its corresponding arm. It can be easily demonstrated that by such an arrangement the indications of the instrument can be adjusted between very wide limits.

A front plate 48 having a window 49 closes the space in front of the needles and scales, while a top plate 50 covers over the tops of the casings and the space within which the needles and weights oscillate. In this manner an extremely efficient protection is afforded against the entrance of dust and the like. When desired, a recording instrument 51 may be combined with the aforementioned indicating instrument.

In the arrangement shown, a recording instrument having a rotating dial 52 is provided, the needles 53 and 54 traveling up and down on a radius of such dial according to the movements of their respective needles. To accomplish this result, the arms 55 and 56 are secured to the shafts 7 and 8 respectively, links 57 connecting said arms to their respective needles.

In Fig. 4, I have shown an indicating instrument of somewhat different form but which nevertheless depends for its indications upon the same principles as are used in the previous case, and which makes use also of sliding plates in conjunction with the fixed scale. In the present case a pair of inclined tubes 58 and 59 are extended along the face of a fixed scale 60. These tubes have their lower ends tapped into bells 60ª and 61 respectively which bells are comparatively large and contain suitable indicating liquid, such as oil. The bell 60ª is connected in any suitable manner with the interior of the furnace, the tube 58 having its free end 62 open to atmosphere. This tube, therefore, indicates the pressure in the furnace as compared to atmosphere. The bell 61 is connected to the flue just in advance of the damper, while the free end of the tube 59 communicates by a connection 63 with the connection leading to the furnace. Therefore, the tube 59 indicates the differential between the furnace and damper pressures. In this case, the sliding plates 64 and 65 are provided, the same being adjustable by means of thumb-screws 66, to the desired position corresponding to the characteristics of the furnace, said plate serving a purpose similar to those of the previously described instrument.

It should be noted that under certain conditions, as in starting up or shutting down a furnace, abnormal pressures might be exerted on the liquids in the bells 60 and 61. These abnormal pressures might drive a portion of the liquid out of the other end of each of the inclined tubes. For the purpose of meeting such a possibility, I have carried the free end of the tube 58 up a considerable distance in the form of an arm 67 and have likewise provided a vertical portion 68 at the upper portion of the tube 59.

I claim:

1. In a device of the class described the combination of a pair of inclosing casings, a shiftable chamber mounted for movement within each casing, one of said casings being open to atmosphere, a connection to the interior of the chamber of said casing, a connection from the interior of said chamber to the other casing, a connection to the interior of the chamber of said last mentioned casing and an indicator operatively connected to each of said chambers, substantially as described.

2. In a device of the class described the combination of an inclosing casing, a shiftable chamber mounted for movement within the same, another shiftable chamber mounted for movement under atmospheric pressure, a common connection to the interior of said last mentioned chamber and to said casing, a connection to the interior of the first mentioned chamber, and an indicator operatively connected to each of said chambers, substantially as described.

3. In a device of the class described the combination of an inclosing casing, a shiftable chamber mounted for movement within the same, another shiftable chamber mounted for movement under atmospheric pressure, a common connection to said last mentioned chamber and to the interior of the casing, a connection to the interior of the first mentioned chamber, an indicator operatively connected to each of said chambers and a common scale for both of said indicators, substantially as described.

4. In a device of the class described the combination of an inclosing casing, a chamber mounted for movement within the same, another chamber mounted for movement under atmospheric pressure, a common connection to the interior of said last mentioned chamber and to the casing, a connection to the interior of the first mentioned chamber, an indicator operatively connected to each of said chambers, a common scale for both of said indicators and means for establishing points on said scale corresponding with the correct pressures within the portions of the device under test, substantially as described.

5. In a device of the class described the combination of an inclosing casing, a shiftable member within the interior of the same, another shiftable member mounted for movement under atmospheric pressure, a common connection to the interior of the inclosing casing and to the last mentioned shiftable member, a connection to the first mentioned shiftable member, an indicator operatively connected to each of said shiftable members, a common scale for both of said indicators, members for establishing the points on said scale corresponding to the correct pressures within the portions of the device under test and means for adjusting said members, substantially as described.

6. In a device of the class described the combination of an inclosing casing, a shiftable chamber mounted for oscillation within the same, another shiftable chamber mounted for oscillation under atmospheric pressure, a common connection to the interior of said last mentioned chamber and to the interior of the inclosing casing, a connection to the interior of the first mentioned chamber, and an indicator operatively connected to each of said chambers, substantially as described.

7. In a device of the class described the combination of an inclosing casing, a curved chamber mounted for oscillation within the same, another curved chamber mounted for oscillation under atmospheric pressure, a common connection to the interior of said last mentioned chamber and to the interior of the inclosing casing, a connection to the interior of the first mentioned chamber and an indicator operatively connected to each of said chambers, substantially as described.

8. In a device of the class described the combination of an inclosing casing, a curved chamber within the same mounted for oscillation about a fixed center, another curved chamber mounted for oscillation about a fixed center under atmospheric pressure, a common connection to the interior of said last mentioned chamber and to the interior of the inclosing casing, a connection to the interior of the first mentioned chamber, an indicator operatively connected to each of said chambers and an adjustable counterbalance connected to each chamber, substantially as described.

9. In a device of the class described the combination of a pair of indicators, a pair of connections to the same, one of said indicators registering according to the difference in pressure between atmospheric and one of said connections and the other of said indicators registering according to the differential between the pressures of the two connections, a common scale for both of said indicators, members for establishing the points on said scale corresponding to the correct pressures within the portions of the device under test, and means for adjusting said members relatively with respect to the scale, substantially as described.

10. In a device of the class described the combination of a pair of indicators, a pair of connections to the same, one of said indicators being adapted to register according to the difference between atmospheric and one of said connections and the other of said indicators being adapted to register according to the differential between the pressures of both of said connections, a common surface fixed relatively to said indicators and adjustable members for establishing the points on said surface corresponding to the correct pressures within the portions of the device under test, substantially as described.

11. In a device of the class described the combination of a pair of indicators, a pair of connections to the same, one of said indicators being adapted to register according to the difference between the pressure in one of said connections and atmospheric and the other of said indicators being adapted to indicate the differential of pressures within said connections, a scaled surface fixed relatively with respect to the indicators, members for establishing points on said surface corresponding to the correct pressures within the portions of the device under test, means for adjusting said members relatively with respect to said scaled surface and symbols on the said members denoting zones of the scaled surface representing an insufficiency and excess of pressure within the portions of the device under test, substantially as described.

WILLIAM A. BLONCK.

Witnesses:
 Wm. P. Bond,
 Walter Hailty.